Jan. 15, 1963  N. L. DETRICK  3,073,579
BOWL SCRAPER FOR KITCHEN MIXERS
Filed Sept. 3, 1957

INVENTOR.
Nellie L. Detrick.
BY
M. Talbert Dick
ATTORNEY.

Witness.
A. L. Martin.

United States Patent Office 3,073,579
Patented Jan. 15, 1963

3,073,579
BOWL SCRAPER FOR KITCHEN MIXERS
Nellie L. Detrick, Rte. 5, Des Moines, Iowa
Filed Sept. 3, 1957, Ser. No. 681,727
3 Claims. (Cl. 259—84)

This invention relates to scrapers and more particularly to a bowl scraper for kitchen mixers.

Most kitchens and places where food is prepared have an electrically powered food mixer available. Such mixers have two rotating beaters extending into the bowl containing the material to be mixed or beaten. Some of these mixers are of the portable type, but most have a base stand and a power means to slowly revolve the bowl during the mixing phase. The chief objection to such equipment is that the beaters do not even approach the inside wall of the bowl, and therefore the material being processed cakes onto the inside wall of the bowl and is not attacked and successfully mixed with the remainder of the material in the vicinity of the bowl center area. Thus, the one operating the mixer must manually and continuously keep scraping the material from the inside wall of the bowl and directing it toward the beaters. This tedious task is usually accomplished by the use of a knife, spoon or like.

Therefore, one of the principal objects of my invention is to provide a bowl scraper that will automatically scrape clinging material from the inside wall of the bowl while it is being mixed by a powered food mixer.

A further object of this invention is to provide a bowl scraper for powered food mixers that will service bowls of various sizes.

A still further object of my invention is to provide a food scraper for revolving bowls that will automatically yieldingly move toward the inside wall of the bowl.

A still further object of this invention is to provide a bowl scraper that will fit substantially all electrically powered food mixers.

A still further object of this invention is to provide a bowl scraper that may be easily and quickly placed on or removed from a powered food mixer.

Still further objects of my invention are to provide a bowl scraper that is economical in manufacture, durable in use and refined in appearance.

These and other objects will be apparent to those skilled in the art.

Figure 1:
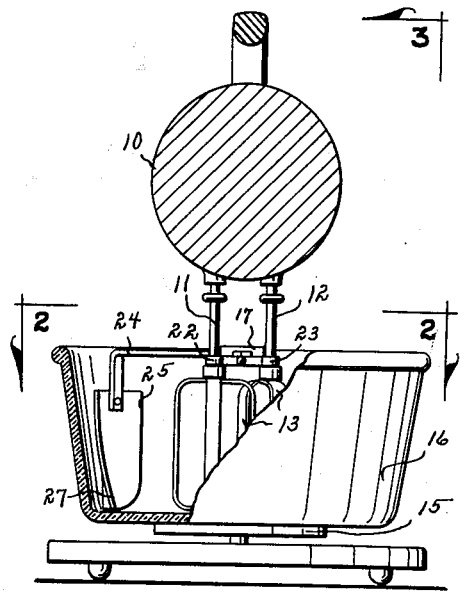
Figure 3:
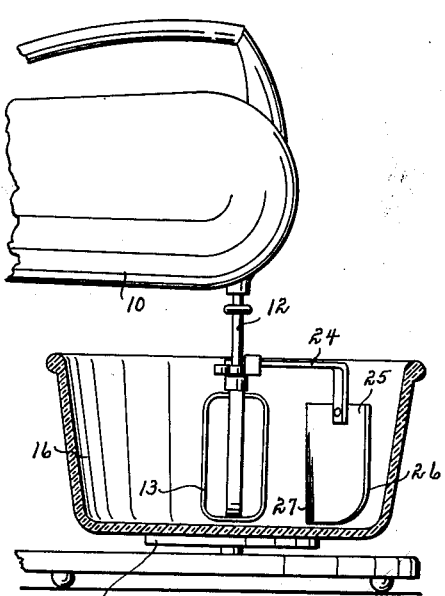
Figure 2:
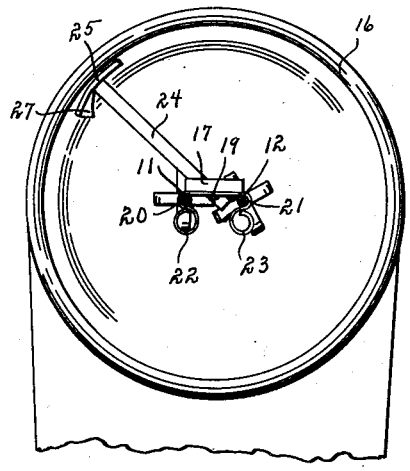
Figure 4:
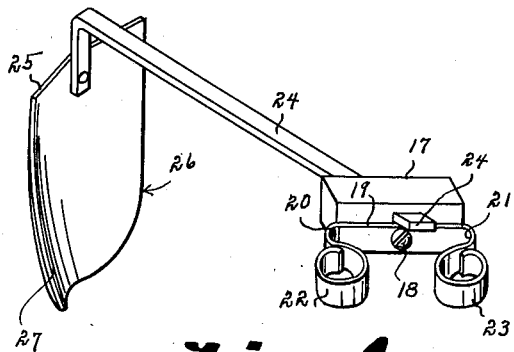

My invention consists in the construction, arrangements, and combination, of the various parts of the device, whereby the objects contemplated are attained as hereinafter more fully set forth, specifically pointed out in my claims, and illustrated in the accompanying drawings, in which:

FIG. 1 is a rear sectional view of a powered food mixer and bowl with my bowl scraper installed thereon, FIG. 2 is a top plan sectional view of my installed scraper taken on line 2—2 of FIG. 1, FIG. 3 is a side sectional view of my installed scraper taken from line 3—3 of FIG. 1, and FIG. 4 is a perspective view of my scraper and more fully illustrates its construction.

In these drawings I have used the numeral 10 to designate an ordinary powered food mixer having two spaced apart downwardly extending rotating shafts 11 and 12, each carrying the usual beater blades 13. The numeral 15 designates the food mixer's rotating bowl platform. The numeral 16 designates a bowl on the platform. It is to such equipment that I install my scraper means and which I will now describe in detail.

The numeral 17 designates a rectangular base plate. Secured by any suitable means (such as a screw 18) on the rear side of this base, is a spring clip means, generally designated by the numeral 19. This clip is made from a strap having its center area secured to the base plate and having its two end portions curved rearwardly and inwardly to provide two open bearing portions 20 and 21, as shown in FIG. 4. From the open bearing portions 20 and 21, each end of the strap is curved outwardly and then forwardly to provide the guide and hand grip circular portions 22 and 23, respectively. The distance between the two open bearings 20 and 21 is substantially that of the distance between the outer side of the shaft 11 to the opposite side of the shaft 12, as shown in FIG. 2. The numeral 24 designates a bar, rectangular in cross section, and having its rear end portion slidably horizontally extending through the base 17. This bar 24 extends at an angle transversely of a mythical line extending between the two bearings 20 and 21. The main length of the bar 24 extends horizontally but its outer end portion is bent downwardly and to which is secured a scraper, generally designated by the numeral 25. This scraper has a generally rectangular vertically elongated outline and is of sheet stock made of any suitable material such as rubber, sheet metal, plastic or like. The leading edge area 26 is shaped to closely engage the inside wall of the bowl. The lower edge end of the leading edge of the scraper is rounded, as shown in FIG. 4. While the scraper is slightly curved horizontally, its trailing edge area 27 is sharply curved rearwardly and inwardly, as shown in FIG. 1.

To install my device, it is merely necessary to place either the open bearing 20 or 21 around one of the mixer's shafts, and then snap the other open bearing back around the other shaft. The spring characteristics of the clip 19 permits this action and when once in place, the block plate 17 will be supported on and between the two mixer shafts. The bar 24 is adjustably slid radially outwardly to approach the inside of the bowl. This adjustment compensates for bowls of different sizes. However, with matter in the bowl and with the bowl rotating, the curved area 27 of the scraper will automatically move the rod 24 outwardly until the scraper contacts the inside wall of the bowl and this contact will be maintained. To remove my scraper, the bar 24 may be slid outwardly from the base plate 17 and the base plate left on the mixer or, if desired, the entire unit may be removed by grasping either of the portions 22 or 23 and springing it from around the mixer shaft.

In the drawings, the bowl rotates to the left. If the bowl rotates to the right, the leading edge and the trailing edge of the scraper are reversed.

The open bearing portions 20 and 21 are spaced apart from each other and therefore engage and embrace the outer sides of the two rotating shafts 11 and 12 of the mixer. Therefore the two shafts rotatably extend through and engage these portions 20 and 21 and the shafts are the sole support of these portions and their base 17.

Some changes may be made in the construction and arrangement of my bowl scraper for kitchen mixers without departing from the real spirit and purpose of my invention, and it is my intention to cover by my claims, any modified forms of structure or use of mechanical equivalents which may be reasonably included within their scope.

I claim:

1. In combination, an electric food mixer having two rotating shafts supporting mixing elements and a rotating bowl, a bowl scraper comprising a base member having a portion detachably embracing and engaging the outer side of one of the shafts of said mixer and a second portion spaced from said first portion detachably embracing and engaging the outer side of the other shaft of said mixer; said two shafts of said mixer rotatably engaging and solely supporting the said first and second portions of said base member, a bar slidably secured to said base member, and a blade scraper on said bar and extending into said bowl.

2. In combination, an electric food mixer having two rotating shafts supporting mixing elements and a rotating bowl, a bowl scraper comprising a base member having a portion detachably embracing and engaging the outer side of one of the shafts of said mixer and a second portion spaced from said first portion detachably embracing and engaging the outer side of the other shaft of said mixer; said two shafts of said mixer rotatably engaging and solely supporting the said first and second portions of said base member, a bar slidably secured to said base member, and a blade scraper on said bar and extending into said bowl; said blade scraper having its trailing edge area curved inwardly relative to said bowl.

3. In combination, an electric food mixer having two rotating shafts supporting mixing elements and a rotating bowl, a bowl scraper comprising a base member having a portion detachably embracing and engaging the outer side of one of the shafts of said mixer and a second portion spaced from said first portion detachably embracing and engaging the outer side of the other shaft of said mixer; said two shafts of said mixer rotatably engaging and solely supporting the said first and second portions of said base member, a bar slidably secured to said base member, and a blade scraper on said bar and extending into said bowl; said two portions of said base member having spring characteristics.

References Cited in the file of this patent
UNITED STATES PATENTS

| | | |
|---|---|---|
| 1,417,885 | Bassert | May 30, 1922 |
| 2,562,790 | Houston | July 31, 1951 |
| 2,753,160 | Gunn | July 3, 1956 |